UNITED STATES PATENT OFFICE.

PRYOR LEA, OF GOLIAD, TEXAS.

IMPROVEMENT IN MIXING MINERAL AND FOSSIL SUBSTANCES WITH BITUMINIZED CLAY TO FORM A PLASTIC MATERIAL.

Specification forming part of Letters Patent No. 144,397, dated November 11, 1873; application filed February 24, 1872.

*To all whom it may concern:*

Be it known that I, PRYOR LEA, of Goliad, in the county of Goliad and State of Texas, have invented a new and Improved Mode of Procedure for Mixing Mineral or Fossil Substances with Bituminated Clay; and I do hereby declare that the following is a full, clear, and exact description thereof.

The first step is to prepare a very fluid composition, consisting of bitumen and water, as a vehicle or receptacle of the firm materials. The proportion of bitumen to the firm materials hereinafter named will depend upon the kind of bitumen used, and the object for which the compound is desired, while the proportions of bitumen and water regulate the percentage of bitumen to be used in connection with the firm materials, the bitumen not exceeding ten per cent. of the proposed amount of finished composition, and the firm materials being sufficient to approximate saturation of the fluid.

The bitumen and water should be thoroughly mixed by stirring immediately preceding the introduction of the firm materials, to secure diffusion of the bitumen with uniformity throughout the composition.

The second step is to prepare the firm materials. These must be clay with its incidents, and mineral or fossil substances, or both combined, and should not exceed two-thirds of the finished product. The clay must be pulverized, and the mineral and fossil substances should also be pulverized or granular, and intimately mixed with the clay and dried.

The third step is to embed the firm materials in the fluid composition above described, until a homogeneous mixture is obtained, and every particle of the firm materials is thoroughly immersed.

The fourth and last step is to exclude the watery component, and to compact the remainder, which twofold object is attained partly by evaporation, and partly by the application of considerable pressure, these operations being alternate and progressive until the permanent ingredients as a mass shall have become as dense as desired.

The mechanical procedure being then completed, subsequent change in the product sustains the mechanical combination and matures the mass, partly from affinity of the permanent ingredients, and partly from the repugnance between bituminous oil and water.

The product is a dense, durable, and economical composition, suitable for building both small and massive structures, and for other purposes.

The product or compound differs from other compounds or products from the fact that the bitumen is carried by the water throughout the whole mass of pulverized or pulverized and granular firm material, and thus the particles receive separately upon themselves the cementing material, which, together with the material, when the water is expelled by evaporation and pressure, forms a homogeneous solid mass.

What I claim as my invention, and desire to secure by Letters Patent, is—

The new compound or product of bitumen, clay, and mineral or fossil substances, or both fossil and mineral substances, the proportions of the bitumen and of the firm materials being about as set forth.

PRYOR LEA.

Witnesses:
A. M. WIGGINTON, Jr.,
JAS. MARTIN.